(12) United States Patent
Xue et al.

(10) Patent No.: US 11,199,739 B2
(45) Date of Patent: Dec. 14, 2021

(54) COLOR FILM SUBSTRATE, DISPLAY PANEL, BACKLIGHT MODULE, DISPLAY DEVICE AND DISPLAY SYSTEM

(71) Applicant: BOE Technology Group Co., Ltd., Beijing (CN)

(72) Inventors: Hongzhen Xue, Beijing (CN); Guobing Yin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 401 days.

(21) Appl. No.: 16/320,229

(22) PCT Filed: May 23, 2018

(86) PCT No.: PCT/CN2018/088065
§ 371 (c)(1),
(2) Date: Jan. 24, 2019

(87) PCT Pub. No.: WO2019/024574
PCT Pub. Date: Feb. 7, 2019

(65) Prior Publication Data
US 2021/0191190 A1 Jun. 24, 2021

(30) Foreign Application Priority Data
Aug. 3, 2017 (CN) .......................... 201710656378.0

(51) Int. Cl.
*G02F 1/1335* (2006.01)
*G02F 1/13357* (2006.01)

(52) U.S. Cl.
CPC .. *G02F 1/133514* (2013.01); *G02F 1/133603* (2013.01); *G02F 1/133607* (2021.01); *G02F 1/133612* (2021.01)

(58) Field of Classification Search
CPC ................................................ G02F 1/133514
See application file for complete search history.

(56) References Cited

U.S. PATENT DOCUMENTS

| 2005/0012882 A1 | 1/2005 | Karman |
| 2010/0164921 A1 | 7/2010 | Ino et al. |

(Continued)

FOREIGN PATENT DOCUMENTS

| CN | 101611372 A | 12/2009 |
| CN | 101688998 A | 3/2010 |

(Continued)

OTHER PUBLICATIONS

Office Action for corresponding Chinese Application 201710656378.0 dated Jan. 30, 2019.

(Continued)

*Primary Examiner* — Edmond C Lau
(74) *Attorney, Agent, or Firm* — Arent Fox LLP; Michael Fainberg

(57) ABSTRACT

The present disclosure relates to the field of display technologies, and particularly discloses a color film substrate, a display panel, a backlight module, a display device and a display system. The color film substrate includes a plurality of pixel units arranged in an array, each of the plurality of pixel units including a first-class filtering unit and a second-class filtering unit, wherein the first-class filtering unit allows visible light to pass through and blocks invisible light, and the second-class filtering unit allows the invisible light to pass through and blocks the visible light.

12 Claims, 5 Drawing Sheets

(56) References Cited

U.S. PATENT DOCUMENTS

| | | |
|---|---|---|
| 2010/0220269 A1 | 9/2010 | Takama et al. |
| 2010/0246212 A1 | 9/2010 | Yang et al. |
| 2014/0022156 A1* | 1/2014 | Han .................... G09G 3/3406 345/102 |
| 2016/0217751 A1* | 7/2016 | Lahti .................... G09G 3/3406 |
| 2017/0094757 A1 | 3/2017 | Gan et al. |
| 2017/0168210 A1 | 6/2017 | Jia |
| 2017/0261811 A1 | 9/2017 | Li |

FOREIGN PATENT DOCUMENTS

| | | |
|---|---|---|
| CN | 101846290 A | 9/2010 |
| CN | 201689437 U | 12/2010 |
| CN | 103033980 A | 4/2013 |
| CN | 105137654 A | 12/2015 |
| CN | 105243997 A | 1/2016 |
| CN | 205229630 U | 5/2016 |
| CN | 105632423 A | 6/2016 |
| CN | 106019712 A | 10/2016 |
| CN | 107219676 A | 9/2017 |

OTHER PUBLICATIONS

International Search Report for PCT/CN2018/088065 dated Aug. 22, 2018.

\* cited by examiner

COLOR FILM SUBSTRATE, DISPLAY PANEL, BACKLIGHT MODULE, DISPLAY DEVICE AND DISPLAY SYSTEM

CROSS-REFERENCES TO RELEVANT APPLICATIONS

The present application is a National Stage of International Application No. PCT/CN2018/088065, filed May 23, 2018, which claims priority from the Chinese patent application No. 201710656378.0, entitled "Color Film Substrate, Display Panel, Backlight Module, Display Device and Display System", filed to Chinese Patent Office on Aug. 3, 2017, both of which are hereby incorporated by reference in their entireties.

FIELD

The present disclosure relates to the field of display technologies, and in particular relates to a color film substrate, a display panel, a backlight module, a display device and a display system.

BACKGROUND

In display devices, a thin film transistor liquid crystal display (TFT-LCD) has the advantages of small size, no radiation and relatively low manufacturing cost, and thus plays a dominant role in a current flat-panel display market. The TFT-LCD usually includes a liquid crystal panel and a backlight module; liquid crystal itself does not emit light, so that backlight module is needed to provide the uniform and high-brightness backlight for the liquid crystal panel.

SUMMARY

Some embodiments of the present disclosure provide a color film substrate comprising a plurality of pixel units arranged in an array, each of the plurality of pixel units including a first-class filtering unit and a second-class filtering unit, wherein the first-class filtering unit allows a visible light to pass through and block an invisible light, and the second-class filtering unit allows the invisible light to pass through and blocks the visible light.

Alternatively, the second-class filtering unit allows an infrared light or an ultraviolet light to pass through.

Alternatively, in each of the plurality of pixel units, there are at least two first-class filtering units of different colors.

Alternatively, in each of the plurality of pixel units, there are three first-class filtering units, separately being a red filtering unit, a green filtering unit and a blue filtering unit.

Alternatively, in each of the plurality of pixel units, the red filtering unit, the green filtering unit, the blue filtering unit and the second-class filtering unit are arranged side by side along a row direction; or in each of the plurality of pixel units, the red filtering unit, the green filtering unit and the blue filtering unit are arranged side by side along a row direction, and the second-class filtering unit is arranged on one side, along a column direction, of the red filtering unit, the green filtering unit and the blue filtering unit.

Alternatively, the first-class filtering unit is made from an optical filter through which only a first specific wavelength passes, and the first specific wavelength is a wavelength of the visible light.

Alternatively, the second-class filtering unit is made from an optical filter through which only a second specific wavelength passes, and the second specific wavelength is a wavelength of the invisible light.

Some embodiments of the present disclosure further provide a display panel including the color film substrate according to any abovementioned technical solution.

Some embodiments of the present disclosure further provides a backlight module including a lamp set that including a plurality of first light sources and a plurality of second light sources, wherein the plurality of first light sources emit the visible light, and the plurality of second light sources emit the invisible light.

Alternatively, the second light sources include infrared LED lamps or ultraviolet LED lamps.

Alternatively, the backlight module further includes a light guide plate, the plurality of first light sources and the plurality of second light sources are alternatively arranged on a light entering side of the light guide plate.

Some embodiments of the present disclosure further provide a display device including the display panel and the backlight module arranged on a light entering side of the display panel, wherein the display panel includes the color film substrate that includes a plurality of pixel units arranged in an array, each of the plurality of pixel units including the first-class filtering unit and the second-class filtering unit; the first-class filtering unit allows the visible light to pass through and blocks the invisible light, and the second-class filtering unit allows the invisible light to pass through and blocks the visible light; and the backlight module includes the lamp set that includes a plurality of first light sources and a plurality of second light sources; the plurality of first light sources emit the visible light, and the plurality of second light sources emit the invisible light.

Alternatively, the second-class filtering unit allows the infrared light to pass through and blocks the visible light, and the second light sources include infrared LED lamps; or the second-class filtering unit allows the ultraviolet light to pass through and blocks the visible light, and the second light sources include ultraviolet LED lamps.

Some embodiments of the present disclosure further provide a display system including the display device according to any abovementioned technical solution, and a reading device; the reading device includes a lens, a photosensitive sensor and a processor arranged in sequence, wherein the lens is configured to allow the invisible light displayed by the display device to pass through;

the photosensitive sensor is configured to convert the invisible light passing through the lens into an electrical signal and output the electrical signal to the processor; and the processor is configured to convert the electrical signal into an image information.

Alternatively, the reading device further includes a display equipment that is electrically connected with the processor and configured to display the image information.

Alternatively, the second-class filtering unit of the display device allows the infrared light to pass through and blocks the visible light, and the photosensitive sensor includes an infrared sensor; or the second-class filtering unit of the display device allows the ultraviolet light to pass through and blocks the visible light, and the photosensitive sensor includes an ultraviolet sensor.

DETAILED DESCRIPTION OF THE EMBODIMENTS

In order to improve visual confusion of human eyes caused by machine-readable information when a display device simultaneously displays the machine-readable information and image information in related technologies, and to improve the display effect of the display device, the embodiment of the present disclosure provides a color film substrate, a display panel, a backlight module, a display device and a display system. In order to make objects, technical schemes and advantages of the present disclosure clearer, the present disclosure is further described in details by the embodiments in the following.

Figure 1:
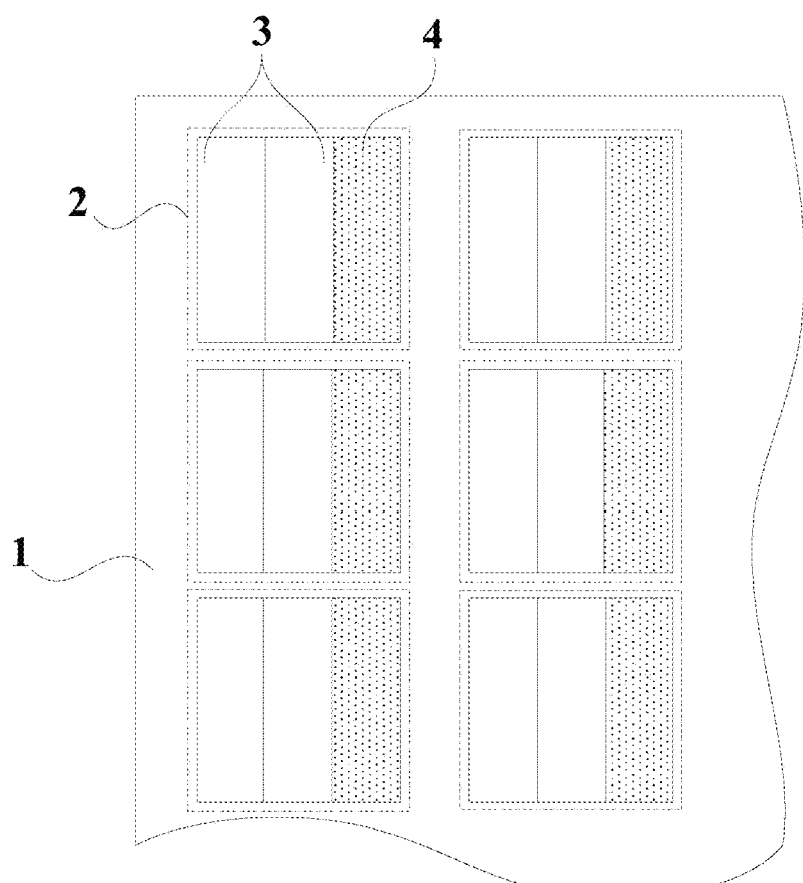
FIG. 1 is the structure schematic diagram of a color film substrate provided by one embodiment of the present disclosure.

As shown in FIG. 1, some embodiments of the present disclosure provide a color film substrate 1 that includes multiple pixel units 2 arranged in an array, each pixel unit 2 including a first-class filtering unit 3 and a second-class filtering unit 4, wherein the first-class filtering unit 3 allows visible light to pass through and blocks the invisible light pass through, and the second-class filtering unit 4 allows invisible light to pass through and blocks visible light pass through.

When the color film substrate 1 provided by the embodiment of the present disclosure is applied to the display device, the first-class filtering unit 3 allows visible light to pass through therefrom and blocks the invisible light pass through therefrom, so that the display device can display image information for people to watch; the second-class filtering unit 4 allow invisible light to pass through and blocks the visible light pass through, so that the display device can display machine-readable information that can be read by specific equipment and is invisible to human eyes; the image information and the machine-readable information are not overlapped, so that when watching the image information, people cannot see the machine-readable information, and thus visual confusion of human eyes caused by the machine-readable information in related technologies can be improved, and the display effect of the display device can be improved.

Alternatively, in some embodiments of the present disclosure, the first-class filtering unit is made from an optical filter through which only light of a first specific wavelength can pass, and the first specific wavelength is the wavelength of visible light. The second-class filtering unit is made from an optical filter through which only a second specific wavelength can pass, and the second specific wavelength is the wavelength of invisible light.

In this embodiment, the invisible light that is allowed to pass through the second-class filtering unit 4 is not limited to a specific type, for example, the invisible light can be infrared light or ultraviolet light.

In this embodiment, in each pixel unit 2, there are at least two first-class filtering units 3 and the colors of the first-class filtering units 3 are different.

In some embodiments of the present disclosure, alternatively, in each pixel unit 2, there are three first-class filtering units 3, separately being a red filtering unit R, a green filtering unit G and a blue filtering unit B. The red filtering unit R, the green filtering unit G and the blue filtering unit B sequentially allow red light, green light and blue light to pass through, the red light, the green light and the blue light can be mixed to form different colors of light to emit out, and thus the display device can display image information for people to watch; the second-class filtering unit 4 allows invisible light to pass through and blocks visible light pass through, so that the display device can display the machine-readable information that can be read by specific equipment and is invisible to human eyes.

Alternatively, in some other embodiments of the present disclosure, the first-class filtering unit includes a first substrate and first pigment particles uniformly distributed in the first substrate, wherein the first substrate includes a resin substrate, and the first pigment particles can allow visible light to pass through and block invisible light pass through.

The second-class filtering unit includes a second substrate and second pigment particles uniformly distributed in the second substrate, wherein the second substrate includes a resin substrate, and the second pigment particles can allow invisible light to pass through and block visible light pass through.

Figure 2:
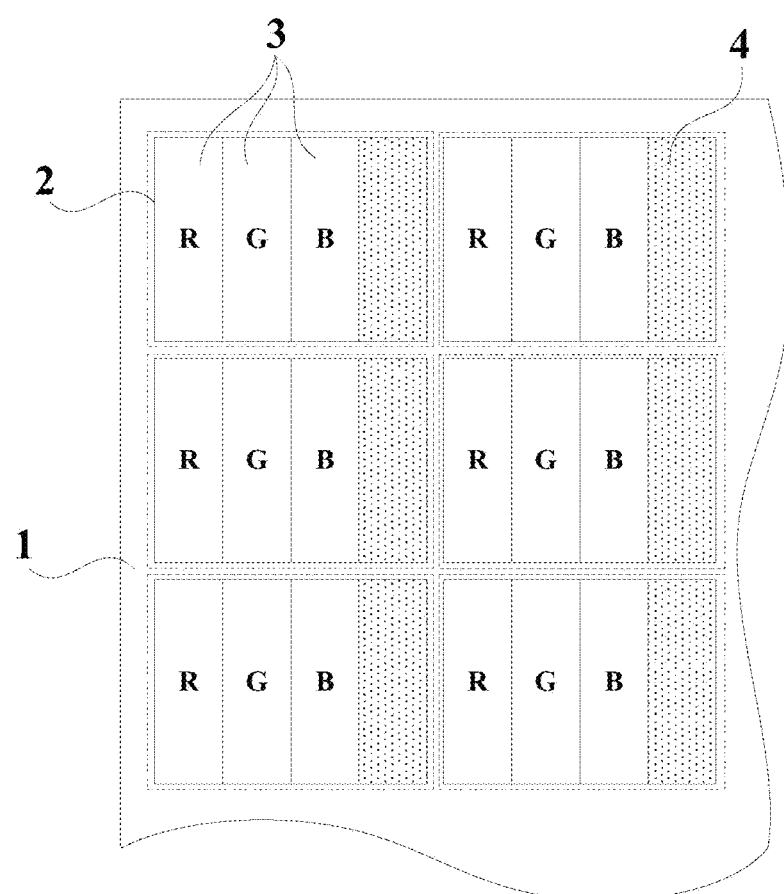
FIG. 2 is the structure schematic diagram of a color film substrate provided by another embodiment of the present disclosure.

As shown in FIG. 2, some other embodiments of the present disclosure provide a color film substrate 1 that includes multiple pixel units 2 arranged in an array provided by the abovementioned embodiment, each pixel unit 2 including a first-class filtering unit 3 and a second-class filtering unit 4, wherein the first-class filtering unit 3 allows visible light to pass through and block invisible light pass through, and the second-class filtering unit 4 allows the invisible light to pass through and block the visible light pass through.

In this embodiment, in each pixel unit 2, the red filtering unit R, the green filtering unit G, the blue filtering unit B and the second-class filtering unit are arranged side by side along a row direction.

When the color film substrate 1 provided by the embodiment of the present disclosure is applied to a display device, the first-class filtering unit 3 allows visible light to pass through and blocks the invisible light pass through, so that the display device can display image information for people to watch; the second-class filtering unit 4 allows invisible light to pass through and blocks the visible light pass through, so that the display device can display machine-readable information that can be read by specific equipment and is invisible to human eyes; the image information and the machine-readable information are not overlapped, so that when watching the image information, people cannot see the machine-readable information, and thus visual confusion of human eyes caused by the machine-readable information in related technologies can be improved, and the display effect of the display device can be improved.

Figure 3:
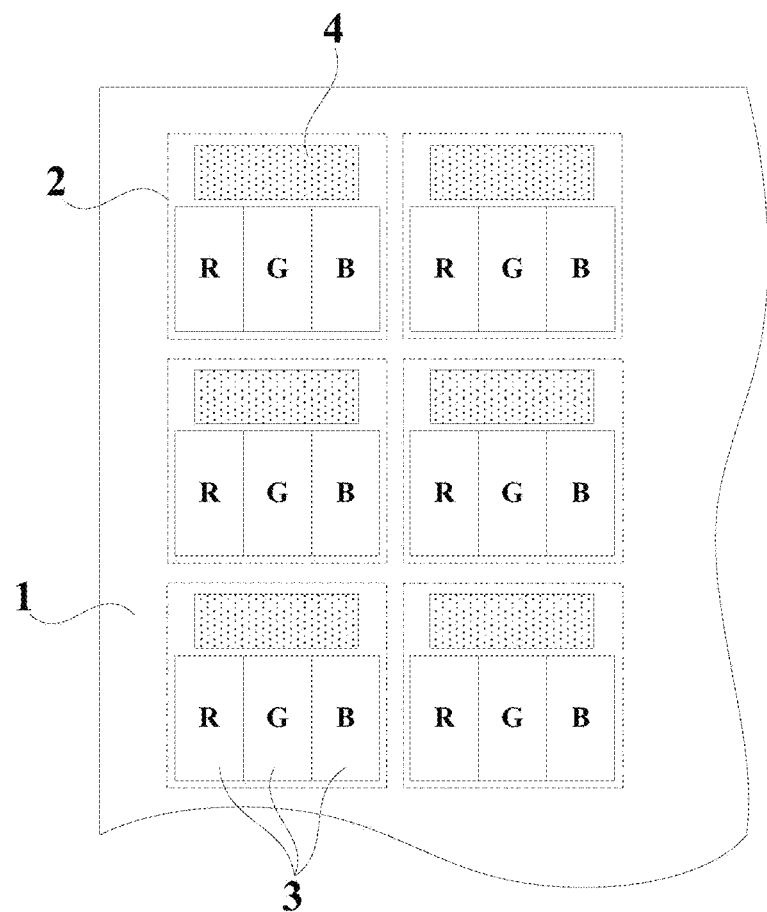
FIG. 3 is the structure schematic diagram of a color film substrate provided by another embodiment of the present disclosure.

As shown in FIG. 3, some other embodiments of the present disclosure provide a color film substrate 1 that includes multiple pixel units 2 arranged in an array provided by the abovementioned embodiment, each pixel unit 2 including a first-class filtering unit 3 and a second-class filtering unit 4, wherein the first-class filtering unit 3 allows visible light to pass through and blocks invisible light pass through, and the second-class filtering unit 4 allows the invisible light to pass through and blocks the visible light pass through.

In this embodiment, in each pixel unit 2, the red filtering unit R, the green filtering unit G and the blue filtering unit R are arranged side by side along a row direction, and the second-class filtering unit 4 is arranged on one sides, along a column direction, of the red filtering unit R, the green filtering unit G and the blue filtering unit B.

When the color film substrate 1 provided by the embodiment of the present disclosure is applied to the display device, the first-class filtering unit 3 allows visible light to pass through and blocks the invisible light pass through, so that the display device can display image information for people to watch; the second-class filtering unit 4 allows invisible light to pass through and blocks the visible light pass through, so that the display device can display machine-readable information that can be read by specific equipment and is invisible to human eyes; the image information and the machine-readable information are not overlapped, so that when watching the image information, people cannot see the machine-readable information, and thus visual confusion of human eyes caused by the machine-readable information in related technologies can be improved, and the display effect of the display device can be improved.

Figure 4:
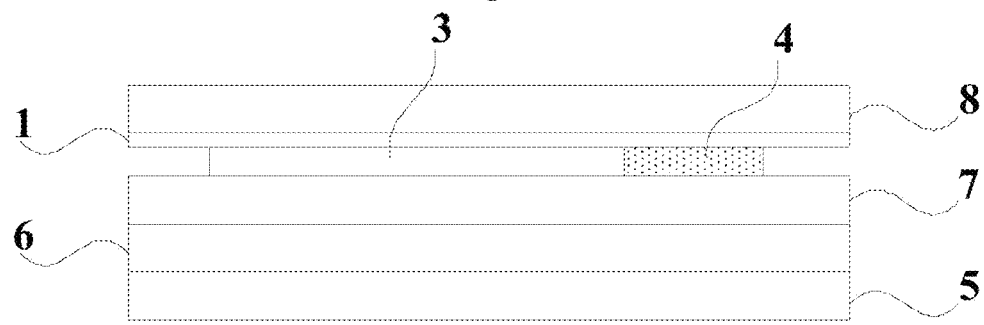
FIG. 4 is the cross section schematic diagram of a display panel provided by some embodiments of the present disclosure.

As shown in FIG. 4, some embodiments of the present disclosure also provides a display panel that includes an array substrate 6 and the color film substrate 1 provided by any abovementioned embodiment; the array substrate 6 and the color film substrate 1 are oppositely arranged.

The display panel further includes a liquid crystal layer 7 arranged between the array substrate 6 and the color film substrate 1, a first polarizer 5 arranged on one side, far away from the liquid crystal layer 7, of the array substrate 6, and a second polarizer 8 arranged on one side, far away from the liquid crystal layer 7, of the color film substrate 1, wherein corresponding to each filtering unit of the color film substrate 1, first electrodes and multiple thin film transistors separately connected with each first electrode are arranged on one side, close to the liquid crystal layer 7, of the array substrate 6, second electrodes of which the positions are opposite to the positions of the first electrodes are arranged on one sides, close to the liquid crystal layer 7, of the multiple pixel units 2 in the color film substrate 1.

In the display panel provided by the embodiment of the present disclosure, the first-class filtering unit 3 in the color film substrate 1 allows visible light to pass through and blocks invisible light pass through, so that the display device can display image information for people to watch; the second-class filtering unit 4 in the color film substrate 1 allows invisible light to pass through and blocks the visible light pass through, so that the display device can display machine-readable information that can be read by specific equipment and is invisible to human eyes; the image information and the machine-readable information are not overlapped, so that when watching the image information, people cannot see the machine-readable information, and thus visual confusion of human eyes caused by the machine-readable information in related technologies can be improved, and the display effect of the display device can be improved.

Figure 5:
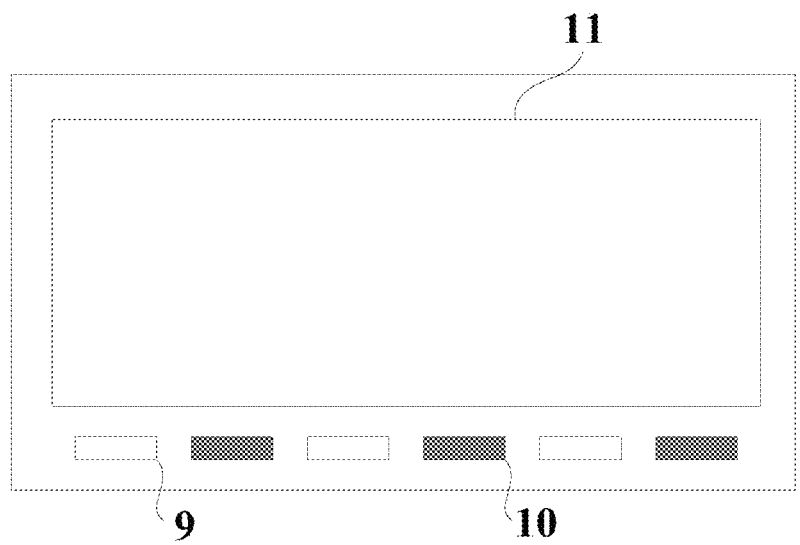
FIG. 5 is the top view of a backlight module provided by some embodiments of the present disclosure.

As shown in FIG. 5, some embodiments of the present disclosure further provide a backlight module including a lamp set that includes multiple first light sources and multiple second light sources, wherein the multiple first light sources emit visible light, and the multiple second light sources emit invisible light.

In the backlight module provided by the present disclosure, when the display device adopts the backlight module and the display panel provided by aforementioned embodiment, visible light emitted by the first light sources passes through the first-class filtering unit 3, so that the display device can display image information for people to watch; invisible light emitted by the second light sources passes through the second-class filtering unit 4, so that the display device can display machine-readable information that can be read by specific equipment and is invisible to human eyes; the image information and the machine-readable information are not overlapped, so that when watching the image information, people cannot see the machine-readable information, and thus visual confusion of human eyes caused by the machine-readable information in related technologies can be improved, and the display effect of the display device can be improved.

Alternatively, the first light sources can be first LED lamps 9, and the second light sources can be second LED lamps 10.

In this embodiment, the second LED lamps are not limited to a specific type, for example, the second LED lamps can be infrared LED lamps or ultraviolet LED lamps.

Figure 6:
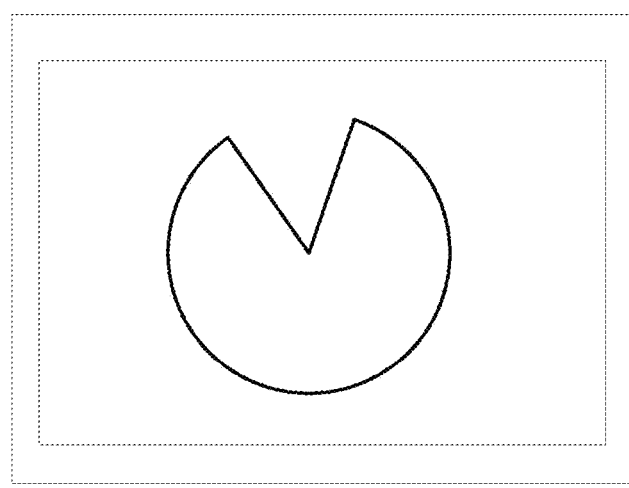
FIG. 6 is image information displayed by a display device provided by some embodiments of the present disclosure.
Figure 7:
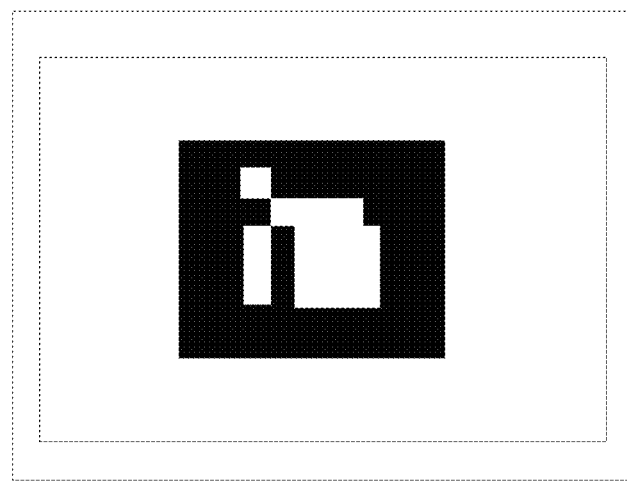
FIG. 7 is machine-readable information displayed by the display device in the FIG. 6.

In the embodiment of the present disclosure, the abovementioned multiple first LED lamps 9 and the abovementioned multiple second LED lamps 10 are not limited in arrangement types. For example, as shown in FIG. 5, in one specific embodiment, the abovementioned multiple first LED lamps 9 and the abovementioned multiple second LED lamps 10 are alternatively arranged on the light entering side of the light guide plate 11. In this embodiment, the first LED lamps 9 and the second LED lamps 10 are arranged on the light entering side of the light guide plate 11, visible light emitted by the first LED lamps 9 and invisible light emitted by the second LED lamps enter the display panel provided by the abovementioned embodiment via the light guide plate 11, the first-class filtering unit 3 allows visible light emitted by the first LED lamps 9 to pass through and blocks the invisible light emitted by the second LED lamps 10, and thus the display device can display image information for people to watch, as shown in FIG. 6; the second-class filtering unit 4 allows invisible light emitted by the second LED lamps 10 to pass through and blocks the visible light emitted by the first LED lamps 9, and thus the display device can display machine-readable information that can be read by specific equipment and is invisible to human eyes, as shown in FIG. 7. Therefore, when watching the image information, people cannot see the machine-readable information, and thus visual confusion of human eyes caused by the machine-readable information in related technologies can be improved, and the display effect of the display device can be improved.

Some embodiments of the present disclosure further provide a display device including a display panel and a backlight module arranged on the back side (namely light entering side) of the display panel, wherein as shown in FIG. 4, the display panel includes an array substrate 6 and a color film substrate 1 arranged opposite to each other; the color film substrate 1 includes multiple pixel units arranged in an array, each pixel unit including a first-class filtering unis 3 and a second-class filtering unit 4; the first-class filtering unit 3 allows visible light to pass through and blocks the invisible light pass through, and the second-class filtering unit 4 allows the invisible light to pass through and blocks the visible light pass through; and as shown in FIG. 5, the backlight module includes a lamp set that includes multiple first light sources and multiple second light sources; the multiple first light sources emit visible light, and the multiple second light sources emit invisible light.

In the display device provided by the present disclosure, visible light emitted by the first light sources passes through the first-class filtering unit 3, so that the display device can display image information for people to watch; invisible light emitted by the second light sources passes through the second-class filtering unit 4, so that the display device can display machine-readable information that can be read by specific equipment; the image information and the machine-readable information are not overlapped, so that when watching the image information, people cannot see the machine-readable information, and thus visual confusion of human eyes caused by the machine-readable information in related technologies can be improved, and the display effect of the display device can be improved.

Alternatively, the first light sources can be first LED lamps 9, and the second light sources can be second LED lamps 10.

In this embodiment, when the second-class filtering unit 4 allows infrared light to pass through and blocks the visible light, the second LED lamps 10 include infrared LED lamps; or when the second-class filtering unit 4 allows ultraviolet light to pass through and blocks the visible light, the second LED lamps 10 include ultraviolet LED lamps.

The display device is not limited to a specific type, for example, the display device can be a flat-panel display, a flat television, a mobile phone, a flat computer, an E-book and the like, which is not specifically limited herein.

In this embodiment, corresponding to each filtering unit, first electrodes and multiple thin film transistors separately connected with each first electrode are arranged on one side, close to the liquid crystal layer 7, of the array substrate 6, and second electrodes of which the positions are opposite to the positions of the first electrodes are arranged on one sides, close to the liquid crystal layer 7, of the multiple pixel units in the color film substrate 1. When the display device is driven, the first LED lamps 9 of the backlight module emit visible light, the second LED lamps 10 emit invisible light, and the light enters the display panel after passing through the light guide plate 11; after a drive voltage is applied to the first electrodes and the second electrodes of the display panel, an electric field is formed between the first electrodes and the second electrodes, liquid crystal molecules of the liquid crystal layer 7 deflect under the effect of the electric field, and thus the light is refracted when passing through the liquid crystal layer 7; through adjusting the electric field between the first electrodes and the second electrodes, the liquid crystal molecules of the liquid crystal layer 7 deflect for different angles, and thus the transmittance of the liquid crystal layer 7 can be changed; the light enters the color film substrate 1 after passing through the liquid crystal layer 7, and the first-class filtering unit 3 allows visible light to pass through and blocks the invisible light pass through, so that the display device can display image information for people to watch; the second-class filtering unit 4 allows invisible light to pass through and blocks the visible light pass through, and thus the display device can display machine-readable information that can be read by specific equipment and is invisible to human eyes. Therefore, when watching the image information, people cannot see the machine-readable information, and thus visual confusion of human eyes caused by the machine-readable information in related technologies can be improved, and the display effect of the display device can be improved.

Figure 8:
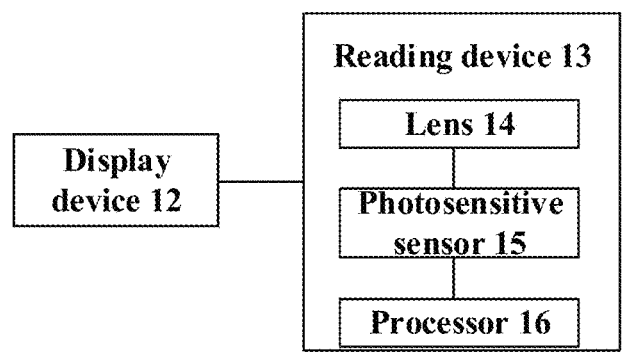
FIG. 8 is the structure schematic diagram of a display system provided by embodiments of the present disclosure.

As shown in FIG. 8, some embodiments of the present disclosure also provide a display system that includes a display device according to the abovementioned embodiment and a reading device 13, wherein the reading device 13 includes a lens, a photosensitive sensor 15 and a processor 16 arranged in sequence, wherein the lens is configured to allow invisible light displayed by the display device to pass through, the photosensitive sensor 15 is configured to convert invisible light passing through the lens 14 into an electrical signal and outputting the electrical signal to the processor 16, and the processor is configured to convert the electrical signal into image information.

In the display system provided by the embodiment of the present disclosure, the display device 12 can simultaneously display image information for people to see and machine-readable information that can be read by specific equipment and is invisible to human eyes, and the reading device 13 is configured to read the machine-readable information displayed by the display device; the image information and the machine-readable information are not overlapped, so that when watching the image information, people cannot see the machine-readable information, and thus visual confusion of human eyes caused by the machine-readable information in related technologies can be improved, and the display effect of the display device 12 in the display system can be improved.

In this embodiment, the reading device 13 further includes a display equipment that is electrically connected with the processor 16 and configured to display the image information.

Specifically, when the second-class filtering unit of the display device 12 allows infrared light to pass through and blocks the visible light, the photosensitive sensor 15 includes an infrared sensor; when the second-class filtering unit of the display device 12 allows ultraviolet light to pass through and blocks the visible light, the photosensitive sensor 15 includes an ultraviolet sensor.

Obviously, some improvements and modifications without departing from the spirit and scope of the present disclosure can also be made by those ordinarily skilled in the art. Therefore, if the improvements and modifications of the present disclosure fall within the scope of claims of the present disclosure and equivalents, the present disclosure is intended to cover the improvements and modifications.

The invention claimed is:

1. A color film substrate, comprising a plurality of pixel units arranged in an array, each of the plurality of pixel units comprising a first-class filtering unit and a second-class filtering unit;

wherein the first-class filtering unit allows a visible light to pass through and block an invisible light, and the second-class filtering unit allows the invisible light to pass through and blocks the visible light;

in each of the plurality of pixel units, there are three first-class filtering units, separately being a red filtering unit, a green filtering unit and a blue filtering unit; and in each of the plurality of pixel units, the red filtering unit, the green filtering unit and the blue filtering unit are arranged side by side along a row direction, and the second-class filtering unit is on one side, along a column direction, of the red filtering unit, the green filtering unit and the blue filtering unit.

2. The color film substrate of claim 1, wherein the second-class filtering unit allows an infrared light or an ultraviolet light to pass through.

3. The color film substrate of claim 1, wherein the first-class filtering unit is made from an optical filter through which only a light of a first specific wavelength passes, and the first specific wavelength is a wavelength of the visible light.

4. The color film substrate of claim 1, wherein the second-class filtering unit is made from an optical filter through which only a light of a second specific wavelength passes, and the second specific wavelength is a wavelength of the invisible light.

5. A display panel, comprising the color film substrate of claim 1.

6. A display device, comprising a display panel and a backlight module arranged on a light entering side of the display panel, wherein
    the display panel comprises a color film substrate of claim 1; and
    the backlight module comprises a lamp set that comprises a plurality of first light sources and a plurality of second light sources; the plurality of first light sources emit the visible light, and the plurality of second light sources emit the invisible light.

7. The display device of claim 6, wherein the second-class filtering unit allow an infrared light to pass through and blocks the visible light, and the second light sources comprise infrared LED lamps; or
    the second-class filtering unit allows an ultraviolet light to pass through and blocks the visible light, and the second light sources comprise ultraviolet LED lamps.

8. A display system, comprising the display device of claim 6, and a reading device, the reading device comprising a lens, a photosensitive sensor and a processor arranged in sequence, wherein
    the lens is configured to allow the invisible light displayed by the display device to pass through;
    the photosensitive sensor is configured to convert the invisible light passing through the lens into an electrical signal and output the electrical signal to the processor; and
    the processor is configured to convert the electrical signal into an image information.

9. The display system of claim 8, wherein the reading device further comprises a display equipment that is electrically connected with the processor and configured to display the image information.

10. The display device of claim 8, wherein the second-class filtering unit of the display device allows the infrared light to pass through and blocks the visible light, and the photosensitive sensor comprises an infrared sensor; or
    the second-class filtering unit of the display device allows the ultraviolet light to pass through and blocks the visible light, and the photosensitive sensor comprises an ultraviolet sensor.

11. The display panel of claim 5, wherein the first-class filtering unit is made from an optical filter through which only a light of a first specific wavelength passes, and the first specific wavelength is a wavelength of the visible light.

12. The display panel of claim 5, wherein the second-class filtering unit is made from an optical filter through which only a light of a second specific wavelength passes, and the second specific wavelength is a wavelength of the invisible light.

* * * * *